Oct. 16, 1962    R. D. BROPHY ETAL    3,058,257
INSECT TRAP
Filed Nov. 8, 1961                         3 Sheets-Sheet 1

INVENTORS
Ralph D. Brophy &
BY  O. T. Greenwood

Victor J. Evans & Co.
Attorneys

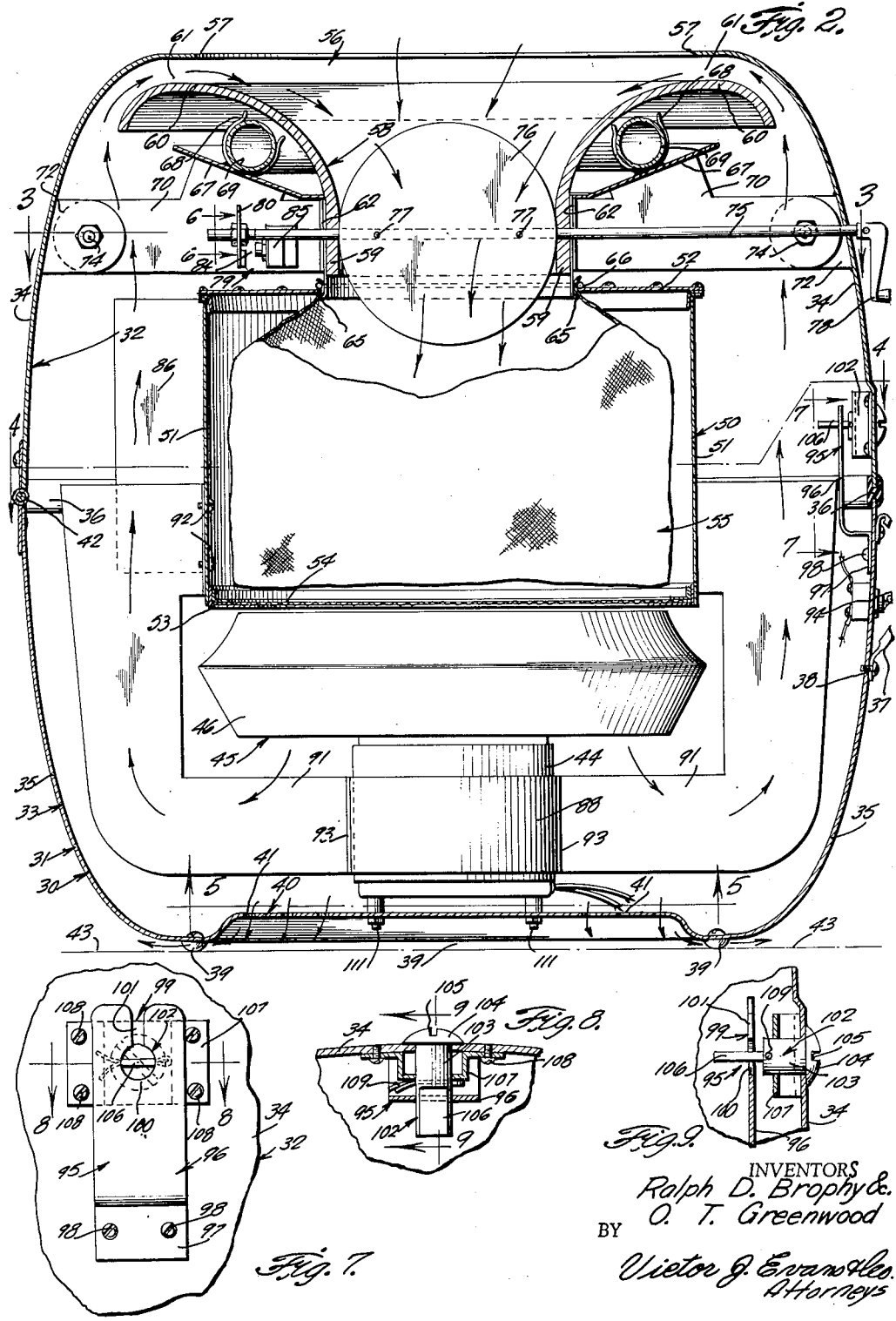

Oct. 16, 1962  R. D. BROPHY ETAL  3,058,257
INSECT TRAP
Filed Nov. 8, 1961  3 Sheets-Sheet 3
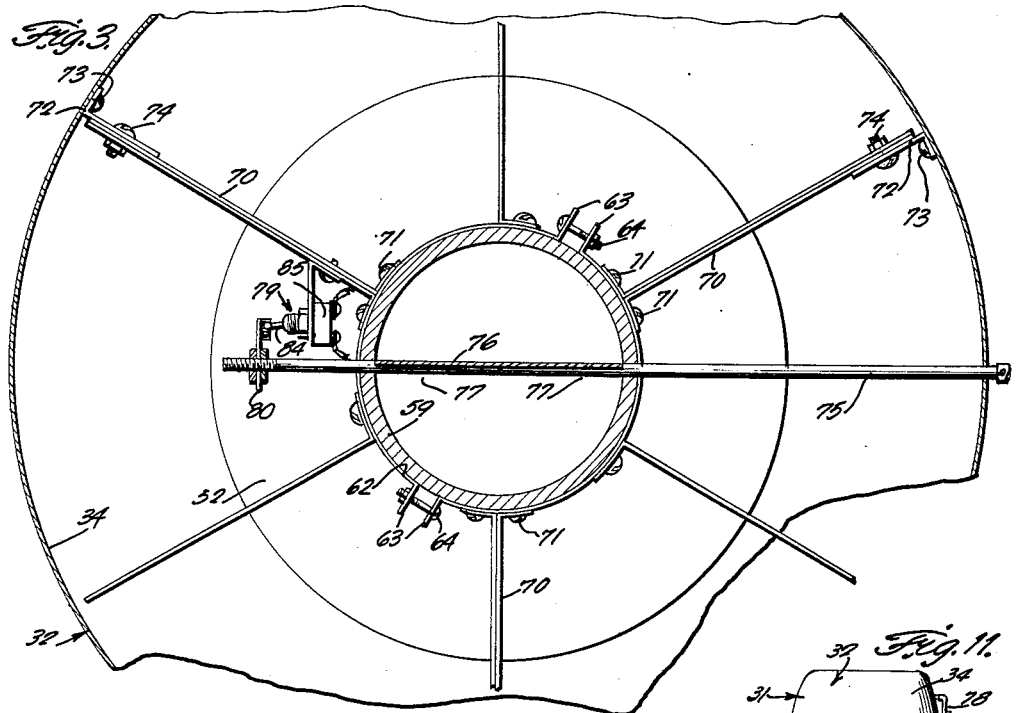
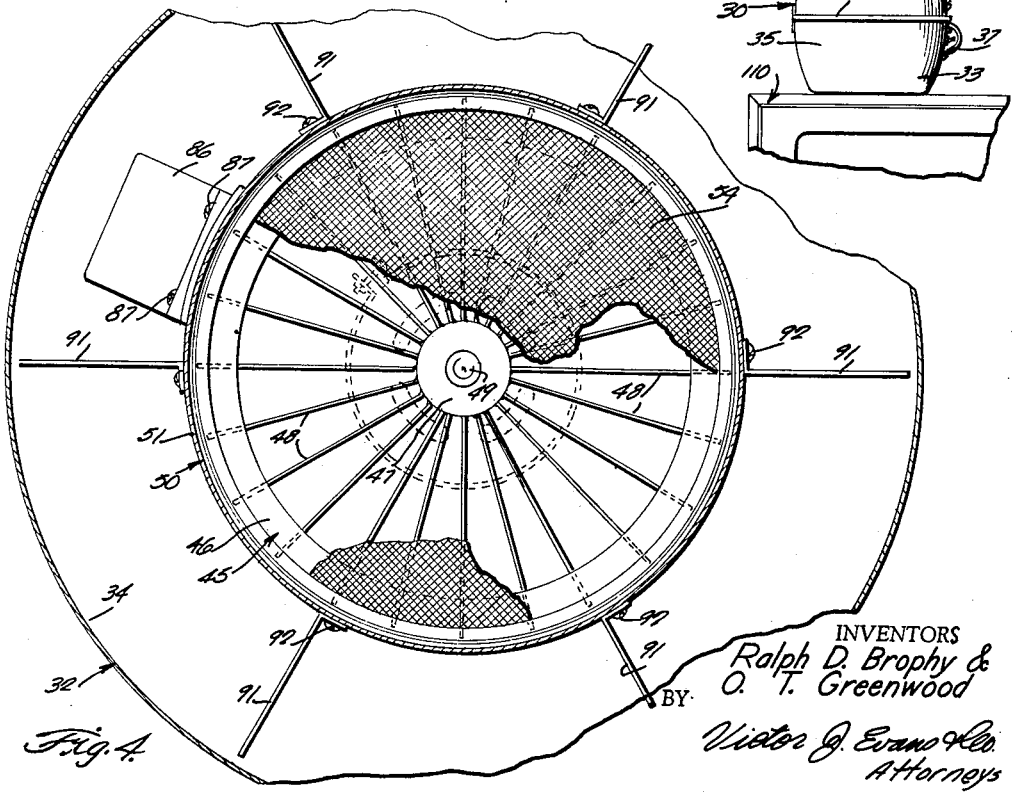
INVENTORS
Ralph D. Brophy &
O. T. Greenwood
BY Victor J. Evans & Co.
Attorneys United States Patent Office 3,058,257
Patented Oct. 16, 1962

3,058,257
INSECT TRAP
Ralph D. Brophy, 927 N. College, and Orville T. Greenwood, Box 43, both of Fayetteville, Ark.
Filed Nov. 8, 1961, Ser. No. 150,935
2 Claims. (Cl. 43—139)

This invention relates to an insect trap, and more particularly to an insect trap that is electrically operated or actuated.

The primary object of this invention is to provide an insect trap which is provided with a light or lamp for attracting insects such as night flying insects to the vicinity of the trap, and wherein there is provided a motor driven fan for causing air to circulate in such a manner that the insects which are attracted by the light will be directed into a bag or receptacle, and wherein the bag or receptacle can be subsequently removed and emptied when desired or required.

Another object of the present invention is to provide an insect trap which can be made as a large unit or small unit, and wherein the insect trap of the present invention includes a switch means for controlling actuation of the fluorescent light or lamp as well as a switch means for controlling actuation of the motor which drives the fan, and wherein there is also provided a means for permitting convenient separation of the housing so that access can be gained to the interior of the housing for emptying the bag containing the insects or the like.

Still another object is to provide such an insect trap that is economical to manufacture and efficient in operation and which is rugged in structure and foolproof in use.

These and other objects of the invention will become apparent from a reading of the following specification and claims, together with the accompanying drawings, wherein like parts are referred to and indicated by like reference characters and wherein:

FIGURE 2 is a sectional view taken on the line 2—2 of FIGURE 1.

FIGURE 3 is a sectional view taken on the line 3—3 of FIGURE 2.

FIGURE 4 is a sectional view taken on the line 4—4 of FIGURE 2.

FIGURE 7 is a sectional view taken on the line 7—7 of FIGURE 2.

FIGURE 8 is a sectional view taken on the line 8—8 of FIGURE 7.

FIGURE 9 is a sectional view taken on the line 9—9 of FIGURE 8.

FIGURE 11 is a side elevational view showing how the present invention can be made as a smaller unit for use on top of a television set or the like in a home or other locality.

Figure 1:
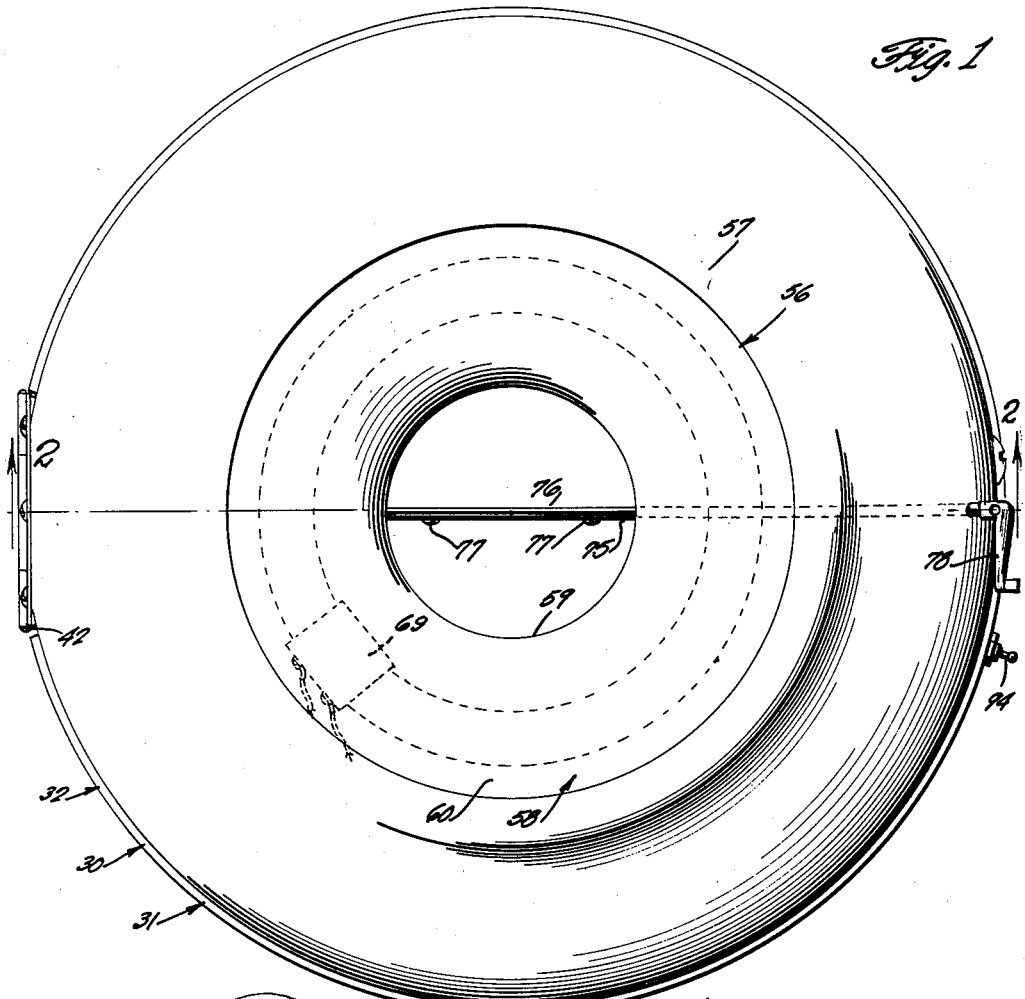
FIGURE 1 is a top plan view of the insect trap constructed according to the present invention.

Referring in detail to the drawings, the numeral 30 indicates the insect trap of the present invention which is shown to comprise a hollow housing that is indicated generally by the numeral 31, and the housing 31 includes upper and lower members 32 and 33, and the upper member 32 includes a generally rounded side wall 34, and the lower member 33 includes a generally rounded or arcuate side wall 35, and the upper and lower members 32 and 33 are hingedly connected together as at 42. The numeral 36 indicates an annular ring element or rubber sealing member which is interposed between the meeting edges of the upper and lower members 32 and 33 so as to insure that there will be a tight seal when the members 32 and 33 are in juxtaposition, as for example as shown in FIGURE 2. A handle 37 is adapted to be secured to the housing 31 as at 38, whereby the handle 37 can be used for facilitating the manual moving of the insect trap 30 from place to place as desired or required.

Depending from the lower member 33 is a plurality of spaced apart support pieces 39 which are adapted to engage a suitable supporting structure such as the supporting structure 43. The lower member 33 is provided with an intermediate raised portion 40 which has a plurality of spaced apart apertures or openings 41 therein for a purpose to be later described.

The numeral 44 indicates an electric motor which is supported on the raised portion 40 and which is secured thereto in any suitable manner, and the motor 44 serves to operate a fan or blower 45, and as shown in the drawings the fan 45 includes a stationary casing 46 as well as a rotary hub 47 which has a plurality of radially disposed blades or vanes 48 affixed thereto, and the blades 48 are adapted to rotate within the stationary casing 46 to cause circulation of air in the desired or required manner. A shaft 49 is driven by the motor 44, and the shaft 49 is suitably affixed to the hub 47 to cause the desired actuation of the fan 45.

The numeral 50 indicates a container which is mounted in the housing 31, and the container 50 includes a cylindrical wall portion as well as a top piece 52, and a bracket 53 is suitably affixed in the lower portion of the container 50. The numeral 54 indicates a screen or reticulated member which is suitably connected to the bracket 53, and the screen 54 is arranged adjacent the inlet end of the fan 45. The numeral 55 indicates a bag or receptacle which is adapted to receive the insects that are trapped, and the bag 55 is positioned within the container 50, and the bag 55 can be made of any suitable material such as cheese cloth or the like.

As shown in the drawings, the upper end of the housing 31 is provided with an inlet opening 56, and the housing includes an arcuate wall portion 57 which is arranged in surrounding relation with respect to the inlet opening 56.

The numeral 58 indicates a body member which is arranged in the upper portion of the housing adjacent the inlet opening 56, and the body member 58 defines a venturi as well as an inner cylindrical portion 59 and an outer flaring portion 60, and the portion 60 is spaced from the wall 57 whereby there is defined a space or passageway 61 which permits some of the air to circulate therethrough.

As illustrated in FIGURE 3 for example, a cylindrical collar 62 surrounds the portion 59 of the body member 58, and the collar 62 includes spaced parallel ears or lips 63 which are interconnected by a bolt and nut assembly 64 whereby the collar 62 is properly maintained on the body member in the desired manner. The numeral 65 indicates a circular flange or shoulder which is formed on the lower edge of the collar 62, and the upper end of the bag 55 is adapted to be held in position contiguous to the flange 65 as for example by means of a rubber band, string or the like as indicated by the numeral 66. When the bag 55 is to be removed or emptied, the retaining member 66 can be disengaged from above the flange 65 so as to permit the bag 55 to be emptied, and when the bag 55 is being emptied, the member 32 is adapted to be hinged upwardly about the hinge 42 so as to permit access to be readily gained to the interior of the housing.

There is also provided a funnel shaped support member 67 which surrounds the body member 58, and a plurality of spaced apart clips 68 are suitably affixed to the support member 67, and the numeral 69 indicates a circular fluorescent light or lamp, and the light 69 is adapted to be supported by the clamps or clips 68. Radially disposed braces 70 are secured as at 71 to the collar 62, and the braces 70 are also secured as by welding to the support member 67, and the outer ends of the braces 70 are connected as at 74 to lugs 72, and the lugs or clips 72 are adapted to be secured in place to the inner surface of the side wall 34 of the upper member 32 as for example by means of set screws 73, FIGURE 3.

The numeral 75 indicates a shaft or rod which extends through the side wall 34 of the upper member 32, and the shaft 75 also extends through the cylindrical portion 59 of the body member 58, and the shaft 75 is rotatably supported in these members. The numeral 76 indicates a disc or valve which is movably mounted in the body member 58, and the valve 76 is secured as at 77 to the rod 75, and there is provided a hand crank 78 on the outer end portion of the shaft 75 for manually turning the valve 76. A switch mechanism 79 is actuated by the movement of the shaft 75, and the switch mechanism 79 includes a plate 80 which is suitably affixed to a portion of the shaft 75, and the plate 80 is adapted to have a cutout or recess 81 therein, FIGURE 6, and contacts 82 and 83 are secured to the plate 80 on opposite sides of the cutouts 81. These contacts 82 and 83 are adapted to selectively engage an arm 84 which extends from the switch units 85, and the switch units are electrically connected in the circuit as later described in this application.

The numeral 86 indicates the usual or conventional ballast for the fluorescent light 69, and the ballast 86 is adapted to be affixed in place as for example the ballast 86 can be secured to the container 50 as at 87.

A generally circular ring member 88 surrounds the motor 44, and the ring member 88 is provided with spaced parallel flanges or lips 89 which are adapted to be connected together by means of a bolt and nut assembly 90. Frame pieces 91 have their lower ends secured as at 93 to the ring member 88, and the upper portions of the frame pieces 91 are secured as at 92 to the container 50, whereby the frame pieces 91 help support these parts in their desired location.

The numeral 94 indicates an "on" and "off" switch which is adapted to be suitably manually actuated for controlling operation of the insect trap of the present invention.

The insect trap of the present invention further includes a locking mechanism which is indicated generally by the numeral 95, and the locking mechanism 95 is adapted to be used for maintaining the upper member and lower member selectively closed or in juxtaposition with respect to each other. The lock 95 comprises a keeper or plate 96 which includes a lower offset portion 97 that is adapted to be secured as at 98 to the side wall 35, and there is provided in the upper portion of the keeper 96 a slot 99 which is shaped to include a lower circular enlarged portion 100 as well as an upper narrow portion 101. The numeral 102 indicates a rotary pin that extends through a portion of the side wall 34, and as shown in FIGURE 8 for example or as shown in FIGURE 9, the pin 102 includes a cylindrical portion 103 as well as an enlarged head 104 on the outer end thereof, and the head 104 has a kerf 105 therein for engagement by a screw driver or the like so as to facilitate turning of the pin 102 as for example when the housing is to be locked or unlocked. The pin 102 is further provided with an inner flattened portion 106 which is mounted for movement into and out of registry or alignment with the narrow portion 101 of the slot 99, and the pin 102 extends through a base piece 107, and the base piece 107 is adapted to be secured in place to the side wall 34 as for example by means of screws or bolts 108, and the numeral 109 indicates a spring member which is operatively connected to the pin 102.

In FIGURE 11 the insect trap of the present invention is shown made in a small size so that it can be conveniently supported in a suitable location, as for example in FIGURE 11 the insect trap is shown being supported on the top of a conventional television set 110.

From the foregoing, it is apparent that there has been provided an insect trap, and in use with the parts arranged as shown in the drawings, it will be seen that with the trap of the present invention actuated, and with the trap connected to a suitable source of electrical energy, the motor 44 will be on and the light 69 will be energized. Light rays given off by the lamp or light 69 will serve to help attract insects to the vicinity of the trap, and portions of the body member 58 may be made transparent or translucent so as to permit the light rays from the lamp 69 to shine therethrough in the most effective or efficient manner. With the motor 44 on, the fan 45 will be actuated since the motor 44 drives the shaft 49 which is connected to the hub 47 of the fan 45, and since the blades 48 are affixed to the rotating hub 47, it will be seen that this actuation of the motor 44 will cause the blades 48 to rotate in the stationary casing 46. This rotation of the blades will cause air to circulate in the desired manner so as for example the air will circulate in the direction of the arrows as shown in FIGURE 2, and insects, bugs or the like being attracted to the light 69 will be drawn or sucked in through the opening 56 and then through the venturi defined by the body member 58, and these insects or bugs will be collected in the bag or receptacle 55. Since the bag 55 is made of cheese cloth or the like, air can flow through the bag 55 but the insects or bugs will remain trapped in the bag 55, and this air which flows through the bag 55 can then pass through the screen 54 and some of the air can flow down and out through the apertures 41 so that this air can help cool the motor 44. Some of this air is also caused to return upwardly and flow through the space 61 between the walls 57 and wall portion 60 so that the air flowing through the space 61 will help force or direct the insects or bugs into the container 55.

Figures 5, 6, 10:
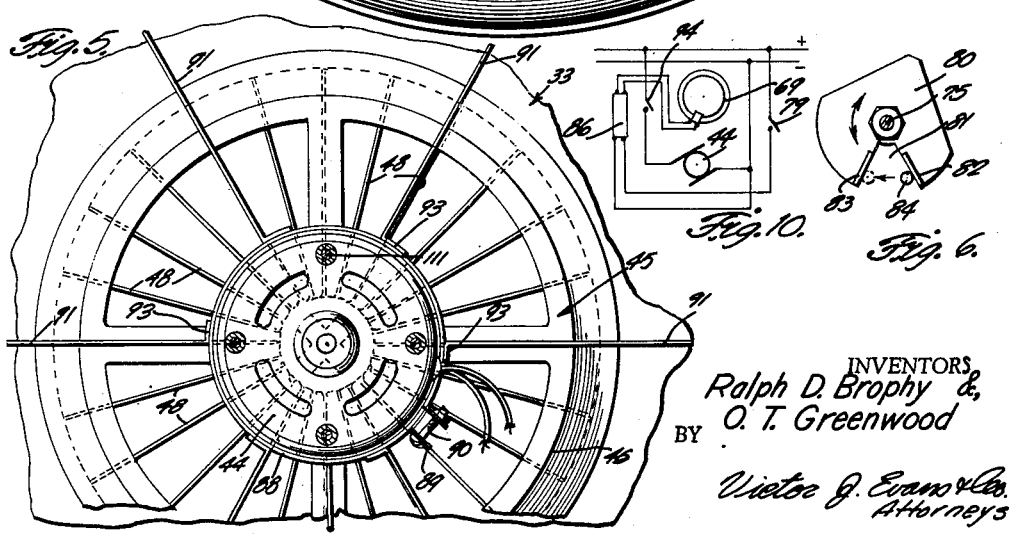
FIGURE 5 is a sectional view taken on the line 5—5 of FIGURE 2.
FIGURE 6 is a sectional view taken on the line 6—6 of FIGURE 2.
FIGURE 10 is a schematic view illustrating wiring diagrams of the present invention.

The motor 44 is adapted to be affixed in place to the raised portion 40, as for example by means of bolts 111, and these bolts 111 are illustrated in FIGURES 2 and 5.

Normally when the insect trap of the present invention is being used, the members 32 and 33 are in juxtaposition or closed relation with respect to each other, as for example as shown in FIGURE 2. However, when it is desired to empty the bag 55 or gain access to the interior of the device, it is only necessary to unlatch the lock 95 whereby the member 32 can be swung upwardly about the hinge 42 so that the member 32 will be separated from the member 33. As the member 32 is moved upwardly on its hinge 42, the parts such as the body member 58 and top piece 52 move upwardly with the member 32, and the bag 55 containing the bugs or insects is also moved upwardly, and the container 50 remains stationary due to its mounting in the bottom member 33. Thus, the bag 55 will be removed or separated from the container 50, and with the bag separated from the container, the string or rubber band 66 can be readily disconnected from the neck portion of the bag so that the bag can be removed from the collar 62 whereby the bag can be emptied and replaced or otherwise cleaned out. After the bag 55 has been emptied, it can be returned to its position on the collar 62 and the rubber band or string 66 can be used for holding the bag in place, and then the member 32 can be returned to its normal closed or juxtaposition relationship relative to the lower member 33, and the lock 95 can be actuated to maintain or hold the member 32 in its contiguous position relative to the member 33.

A shown in the drawings, the shaft 75 is adapted to be manually turned by means of the crank 78, and as the shaft 75 is turned the valve 76 will be turned in the body member 58 so that the valve 76 can be positioned at a desired location to control the incoming air and inserts which enter the bag 55. At the same time, when the shaft 75 is turned by the crank 78, the switch 79 will be selectively actuated, and since the switch 79 is electrically connected in the circuit as shown in FIGURE 10, it will be seen that this rotation or movement of the shaft 75 will control the switch 79, and with the switch 79 electrically connected to the ballast 86 and lamp 69, it will be seen that by moving the crank 78, the energization or de-energization of the lamp 69 can be controlled. The switch 94 is electrically connected to the motor 44 so that by turning the switch 94 on or off the motor 44 can be turned on or off in order to control actuation of the fan 45.

The motor 44 has the ring member 88 connected thereto, and the frame pieces 91 are suitably affixed to the ring member 88, and these frame pieces 91 are secured as at 92 to the container 50 so that the container 50 will be properly supported or mounted in the housing. These parts are arranged or constructed so that air can circulate through the housing in the desired or required manner to accomplish the desired results.

With further regard to the switch 79, it will be seen that the arm 84 extends through the opening 81 in the plate 80 on the shaft 75, and with the contacts 82 and 83 secured to the plate 80, it will be seen that as the shaft 75 is rotated or turned, the plate 80 will be turned so that the contacts 82 or 83 will selectively engage the arm 84 to move the arm 84 from left to right or vice versa whereby the switch unit 85 can be turned on or off, depending upon the direction of rotation of the shaft 75.

The ring element 36 is adapted to be made of a suitable material such as rubber, plastic or the like, and this ring element 36 serves to insure that there will be a tight seal between the elements or members 32 and 33 when the members are in juxtaposition relative to each other.

The lock 95 which serves to selectively maintain the members 32 and 33 contiguous to each other can be manually actuated, and as shown in the drawings the lock 95 includes the pin 102 which is rotatably supported in the wall 34, so that by engaging a screw driver or the like with the kerf 105 in the head 104, the pin 102 can be turned ninety degrees in order to cause the flat portion 106 to move into and out of registry with the narrow portion 101 of the slot 99. With the flat portion 106 arranged at right angles with respect to the narrow portion 101 as shown in FIGURE 7, the mechanism 95 will be in locked position. By turning the pin 102 to a position ninety degrees from that shown in FIGURE 7, the flat portion 106 will be aligned or in registering relation with respect to the narrow portion 101 so that the lock will be unlatched and wherein the members 32 and 33 can be separated or opened. The spring member 109 helps maintain the pin 102 stationary in its different adjusted positions so that the pin 102 will not likely move out of its adjusted positions until sufficient pressure is applied thereto by means of the screw driver or the like. The support member 67 provides a support for the lamp or light 69, and the support member 67 is held in place by means of the braces 70 which are affixed in place as previously stated or described.

The insect trap of the present invention can be made as a large unit, or else it can be made so that it has a small compact construction so that for example as shown in FIGURE 11 it can be supported on a television set such as the television set 110 in order to trap insects, bugs or the like which may be indoors.

The parts can be made of any suitable material and in different shapes or sizes.

The fluorescent tube or lamp 69 helps attract the insects to the device, and the air is caused to circulate in such a manner that the insects will be drawn into the container 55. The body member 58 is shaped to provide a venturi so that currents of air will be set up in such a manner as to help cause the insects to be drawn into the bag 55. The venturi also increases the air velocity, and the valve 76 can be adjusted to regulate the size of air passage. The device can be made as a portable unit, and the handle 37 can be used for lifting or carrying the device from place to place, or else the device can be made in a larger size for commercial establishments or the like. The present invention is especially suitable for use in trapping night flying insects or after dark insects. The insects are caused to enter the bag 55 due to the dual action of the air being sucked in by the fan 45 as well as by the air blowing through the spaces 61 and helping to force the insects into the bag. Some of the air is directed out through the openings 41 to help cool the motor 44 so as to prevent overheating thereof. The outer surface of the device may be attractively decorated or designed so as to enhance the attractiveness of the device, as for example when the device is being used in a home or the like. The miniature insect trap shown in FIGURE 11 can be used as a bug catcher inside of a home or the like and it can also be used as a night light, television light or the like. The light 69 is arranged below the portion 60 of the body member 58, and with the member 58 being made of a suitable material such as a plastic material, the insects will be attracted to the light 69 and the insects will be hit by the return air flowing through the passageways or spaces 61 and the insects will be sucked into the bag 55 due to the suction created by the fan 45. Fresh air at all times is drawn in from the outside by the fan. Suitable braces, bearings or the like can be used wherever desired or required.

Although the invention herein described is fully capable of achieving the objects and providing the advantages hereinbefore mentioned, it is to be understood that it is merely illustrative of the presently preferred embodiment of the invention, and that it is not to be limited to the details of construction herein described other than as defined in the appended claims.

What is claimed is:

1. An insect trap comprising a hollow housing including upper and lower members hingedly connected together, a yieldable ring element interposed between the meeting edges of said upper and lower members, a plurality of support pieces depending from said lower member, said lower member including an intermediate raised portion having a plurality of spaced apart apertures therein, a motor supported on said raised portion, a fan driven by said motor, a container mounted in said housing, a screen positioned in the lower portion of said container, a bag arranged in said container, the upper end of said housing being provided with an inlet opening therein, said housing including an arcuate wall portion surrounding said opening, a body member arranged in said housing adjacent said inlet opening and said body member defining a venturi, said body member including an inner cylindrical portion and an outer flaring portion which is spaced from the arcuate wall portion of the housing, a collar arranged in said housing and surrounding the cylindrical portion of said body member, a funnel shaped support member arranged above said collar, clips on said support member, a circular light supported by said clips, radially disposed braces for supporting said support member, a shaft extending through said upper member and through the cylindrical portion of said body member, a valve arranged in said body member and connected to said shaft, a crank connected to the outer end of said shaft, an electrical circuit including a switch connected to said light, a ring member surrounding said motor, frame pieces affixed to said ring member and said frame pieces being also affixed to said container, an "on" and "off" switch connected to the lower member of said housing, and a latch for selectively retaining said upper and lower members in juxtaposition.

2. An insect trap comprising a hollow housing including upper and lower members hingedly connected together, a yieldable ring element interposed between the meeting edges of said upper and lower members, a plurality of support pieces depending from said lower member, said lower member including an intermediate raised portion having a plurality of spaced apart apertures therein, a motor supported on said raised portion, a fan driven by said motor, a container mounted in said housing, a screen positioned in the lower portion of said container, a bag arranged in said container, the upper end of said housing being provided with an inlet opening therein, said housing including an arcuate wall portion surrounding said opening, a body member arranged in said housing adjacent said inlet opening and said body member defining a venturi, said body member including an inner cylindrical portion and an outer flaring portion which is spaced from the arcuate wall portion of the housing, a collar arranged in said housing and surrounding the cylindrical portion of said body member, a funnel shaped support member arranged above said collar, clips on said support member, a circular light supported by said clips, radially disposed braces for supporting said support member, a shaft extending through said upper member and through the cylindrical portion of said body member, a valve arranged in said body member and connected to said shaft, a crank connected to the outer end of said shaft, an electrical circuit including a switch connected to said light, a ring member surrounding said motor, frame pieces affixed to said ring member and said frame pieces being also affixed to said container, an "on" and "off" switch connected to the lower member of said housing, and a latch for selectively retaining said upper and lower members in juxtaposition, said latch comprising a keeper having a lower offset portion affixed to said lower member, said keeper having in its upper portion a slot which includes an enlarged circular portion and a narrow portion which communicates with said circular portion, a pin extending through said lower member and having an enlarged head on its outer end, and a flattened shank on the inner portion of said pin adapted to selectively register with the narrow portion of said slot.

References Cited in the file of this patent

UNITED STATES PATENTS

| | | |
|---|---|---|
| 2,013,969 | Menasche | Sept. 10, 1935 |
| 2,734,214 | Gerber | Feb. 14, 1956 |
| 2,879,620 | McGinnis | Mar. 31, 1959 |
| 2,958,894 | Carabet | Nov. 8, 1960 |
| 3,002,216 | Beach | Oct. 3, 1961 |

FOREIGN PATENTS

| | | |
|---|---|---|
| 424,235 | Great Britain | Feb. 18, 1935 |
| 688,871 | Great Britain | Mar. 18, 1953 |
| 326,893 | Italy | June 26, 1935 |